(12) United States Patent
Yamauchi et al.

(10) Patent No.: US 11,842,624 B2
(45) Date of Patent: Dec. 12, 2023

(54) CONTROL METHOD AND INFORMATION PROCESSING APPARATUS

(71) Applicant: Panasonic Intellectual Property Corporation of America, Torrance, CA (US)

(72) Inventors: Masaki Yamauchi, Osaka (JP); Nanami Fujiwara, Osaka (JP); Takeshi Kawaguchi, Cupertino, CA (US); Kaoru Murakami, Tokyo (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 304 days.

(21) Appl. No.: 17/460,685

(22) Filed: Aug. 30, 2021

(65) Prior Publication Data
US 2021/0390845 A1    Dec. 16, 2021

Related U.S. Application Data

(63) Continuation of application No. PCT/JP2021/000772, filed on Jan. 13, 2021.
(Continued)

(51) Int. Cl.
*G08B 31/00* (2006.01)
*G06Q 40/08* (2012.01)
*H04L 67/01* (2022.01)

(52) U.S. Cl.
CPC ............ *G08B 31/00* (2013.01); *G06Q 40/08* (2013.01); *H04L 67/01* (2022.05)

(58) Field of Classification Search
CPC .... G08B 31/00; G08B 13/1672; G06Q 40/08; G06Q 30/02; G06Q 30/06; H04L 67/01; H04L 67/55; G06F 16/9535; G06F 16/252
(Continued)

(56) References Cited

U.S. PATENT DOCUMENTS 10,102,585 B1 * 10/2018 Bryant .............. H04L 12/2823
10,137,984 B1 * 11/2018 Flick ..................... G05D 1/102
(Continued)

FOREIGN PATENT DOCUMENTS

JP      2015-219765      12/2015

OTHER PUBLICATIONS

International Search Report (ISR) dated Apr. 13, 2021 in International (PCT) Application No. PCT/JP2021/000772.

*Primary Examiner* — Omar Casillashernandez
(74) *Attorney, Agent, or Firm* — Wenderoth, Lind & Ponack, L.L.P.

(57) ABSTRACT

A processor: transmits detection information detected by a first device and user information obtained by a second device to a network; determines that a first event occurred based on the detection information and the user information; determines content based on the first event; and notifies the user of the content by transmitting data indicating the content to the first or second device via the network after elapse of a given amount of time predetermined per event from an occurrence of the first event. The first event potentially causes a problem in at least one of a home, property, or physical body of the user, or a service expected by the user. The content is at least one of a product or service for addressing the problem, or insurance that provides compensation for damages incurred by the user if the problem were to actually occur.

9 Claims, 6 Drawing Sheets

Related U.S. Application Data

(60) Provisional application No. 62/962,459, filed on Jan. 17, 2020.

(58) Field of Classification Search
 USPC .......................................................... 340/519
 See application file for complete search history.

(56) References Cited

U.S. PATENT DOCUMENTS

2018/0033087 A1* 2/2018 Delinselle .............. G06Q 40/08
2022/0327909 A1* 10/2022 Hahm ................. H04L 12/2827

* cited by examiner

FIG. 2

| No. | First Event | Category | Degree of Urgency | Location of Occurrence | Content Data Transmission Timing |
|---|---|---|---|---|---|
| 1 | Event A | Attempted break-in | Low | Home/bedroom | Tomorrow afternoon |
| 2 | Event B | Attempted break-in | Medium | Home/bedroom | Tomorrow morning |
| 3 | Event C | Attempted break-in | High | A nearby home | Immediately after searching |
| 4 | Event D | Earthquake (minor) | Low | Home | After the user calms down |
| 5 | Event E | Accident | Medium | Living room | After the child stops crying and the parent calms down |
| 6 | Event F | Injury/accident | Low | Home/kitchen/yard | One year later |
| 7 | Event G | Illness/health | High | Home/work | Before the results of the user's next health checkup are released |
| 8 | Event H | Vacation | High | Home/living room | During vacation planning |
| 9 | Event I | Fire | Low | Home/kitchen | After the battery is changed |
| 10 | Event J | Fire | High | Neighborhood | After searching |
| 11 | Event K | Fire | Medium | Kitchen | After the user calms down |
| 12 | Event L | Malfunction | Medium | Home/work | After the abnormality in the PC is resolved |

FIG. 3

| No. | Second Event | Related First Event | Content Data Transmission Timing |
|---|---|---|---|
| 1 | A noise at night | Event A | Immediately after occurrence of the second event |
| 2 | A noise at night | Event B | Immediately after occurrence of the second event |
| 3 | Reception of news of a different break-in | Event C | Immediately after occurrence of the second event |
| 4 | Reception of news related to the earthquake | Event D | After the shaking subsides and the user has calmed down |
| 5 | A noise and a child's crying voice | Event E | After the child stops crying and the parent calms down |
| 6 | A noise | Event F | At least one year later and immediately after occurrence of the second event |
| 7 | Further worsening of the user's health checkup results | Event G | While the user is looking at the results of their health checkup |
| 8 | A weather forecast for the destination of the user's next vacation including a chance of rain of at least 60% | Event H | Immediately after occurrence of the second event |
| 9 | Depletion of the fire alarm battery | Event I | After the battery is changed |
| 10 | The sound of a siren | Event J | Immediately after occurrence of the second event |
| 11 | Boil-over occurring again within one week | Event K | Immediately after occurrence of the second event |
| 12 | Creation of a file having a longer editing time than usual | Event L | While the second event is occurring |

FIG. 4

| No. | Detection Information | User Information | First Event | Content |
|---|---|---|---|---|
| 1 | A noise at night | Light switch switched on and then off | Event A | Security camera/home security service/theft insurance |
| 2 | A noise at night | Scream --> light switch switched on and then off | Event B | Security camera/home security service/theft insurance |
| 3 | Reception of news of a break-in | User searched for news of the break-in | Event C | Security camera/home security service/theft insurance |
| 4 | Reception of news of an earthquake | User searched for news of the earthquake --> does not leave their home | Event D | Disaster goods/earthquake insurance |
| 5 | A noise and a child's crying voice | A parent's startled voice | Event E | Safety goods/non-life insurance |
| 6 | A noise | User searched for a hospital | Event F | Accident insurance |
| 7 | Worse health checkup results | User searched for their next health checkup | Event G | Medical insurance |
| 8 | A weather forecast for the destination of the user's upcoming vacation of rain | User searched for a destination for their next vacation | Event H | Rainy weather travel insurance/a different tour |
| 9 | Depletion of the fire alarm battery | User changed the battery in the fire alarm | Event I | Fire insurance |
| 10 | Reception of news of an arson attack in the neighborhood | User searched for news of the arson attack in the neighborhood | Event J | Fire insurance/fire extinguisher |
| 11 | Boil-over | User turned off the cooking appliance after elapse of a given amount of time from the occurrence of the boil-over | Event K | Fire insurance/fire extinguisher/maintenance service |
| 12 | PC abnormality | User performed a search related to troubleshooting | Event L | PC support service |

CONTROL METHOD AND INFORMATION PROCESSING APPARATUS

CROSS REFERENCE TO RELATED APPLICATIONS

This is a continuation application of PCT International Application No. PCT/JP2021/000772 filed on Jan. 13, 2021, designating the United States of America, which is based on and claims priority of U.S. Provisional Patent Application No. 62/962,459 filed on Jan. 17, 2020. The entire disclosures of the above-identified applications, including the specifications, drawings, and claims are incorporated herein by reference in their entirety.

FIELD

The present disclosure is related to a control method and an information processing apparatus.

BACKGROUND

A technique of determining content to recommend to a user based on the behavior of the user and delivering the determined content to the user's terminal is known (for example, see Patent Literature (PTL) 1).

CITATION LIST

Patent Literature

PTL 1: Japanese Unexamined Patent Application Publication No. 2015-219765

SUMMARY

Technical Problem

However, with the technique disclosed in PTL 1, there is a need to further improve the customer appeal of the delivered content to the user.

In view of this, the present disclosure provides a control method and an information processing apparatus capable of improving the customer appeal of the content to the user.

Solution to Problem

A control method according to one aspect is a control method in a system including at least one processor and a storage apparatus. The control method causes the at least one processor to perform the following: transmitting detection information and user information to a network, the detection information being detected by a first device, the user information being related to a user and obtained by a second device; determining that a first event occurred based on the detection information and the user information, the first event being any one of a plurality of events stored in the storage apparatus, the first event being an event that potentially causes a problem in at least one of a home of the user, property owned by the user, a service expected by the user, or a physical body of the user; determining content based on the first event, the content being at least one of a product for addressing the problem, a service for addressing the problem, or insurance that provides compensation for damages incurred by the user if the problem were to actually occur; and notifying the user of the content by transmitting data indicating the content to the first device or the second device via the network after elapse of a given amount of time from an occurrence of the first event, the given amount of time being predetermined per event included in the plurality of events.

An information processing apparatus according to one aspect of the present disclosure is capable of communicating with a first device and a second device via a network, and includes a processor and a storage apparatus. Using the storage apparatus, the processor: transmits detection information and user information to the network, the detection information being detected by the first device, the user information being related to a user and obtained by the second device; when the processor determines that a first event occurred based on the detection information and the user information, receives data indicating content via the network after elapse of a given amount of time from an occurrence of the first event, the first event being any one of a plurality of events that are predefined, the first event being an event that potentially causes a problem in at least one of a home of the user, property owned by the user, a service expected by the user, or a physical body of the user, the content being at least one of a product for addressing the problem, a service for addressing the problem, or insurance that provides compensation for damages incurred by the user if the problem were to actually occur, and the given amount of time being predetermined per event included in the plurality of events; and notifies the user of the content by transmitting the data received to the first device or the second device via the network.

General or specific aspects of the present disclosure may be realized as a system, a method, an integrated circuit, a computer program, a computer-readable recording medium such as a compact disc-read only memory (CD-ROM), or any given combination thereof.

Advantageous Effects

The control method and the like according to one aspect of the present disclosure are capable of improving customer appeal of the content to the user.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2 illustrates one example of a first event database according to the embodiment.

FIG. 3 illustrates one example of a second event database according to the embodiment.

FIG. 4 illustrates one example of a content database according to the embodiment.

DESCRIPTION OF EMBODIMENT(S)

Figure 1:
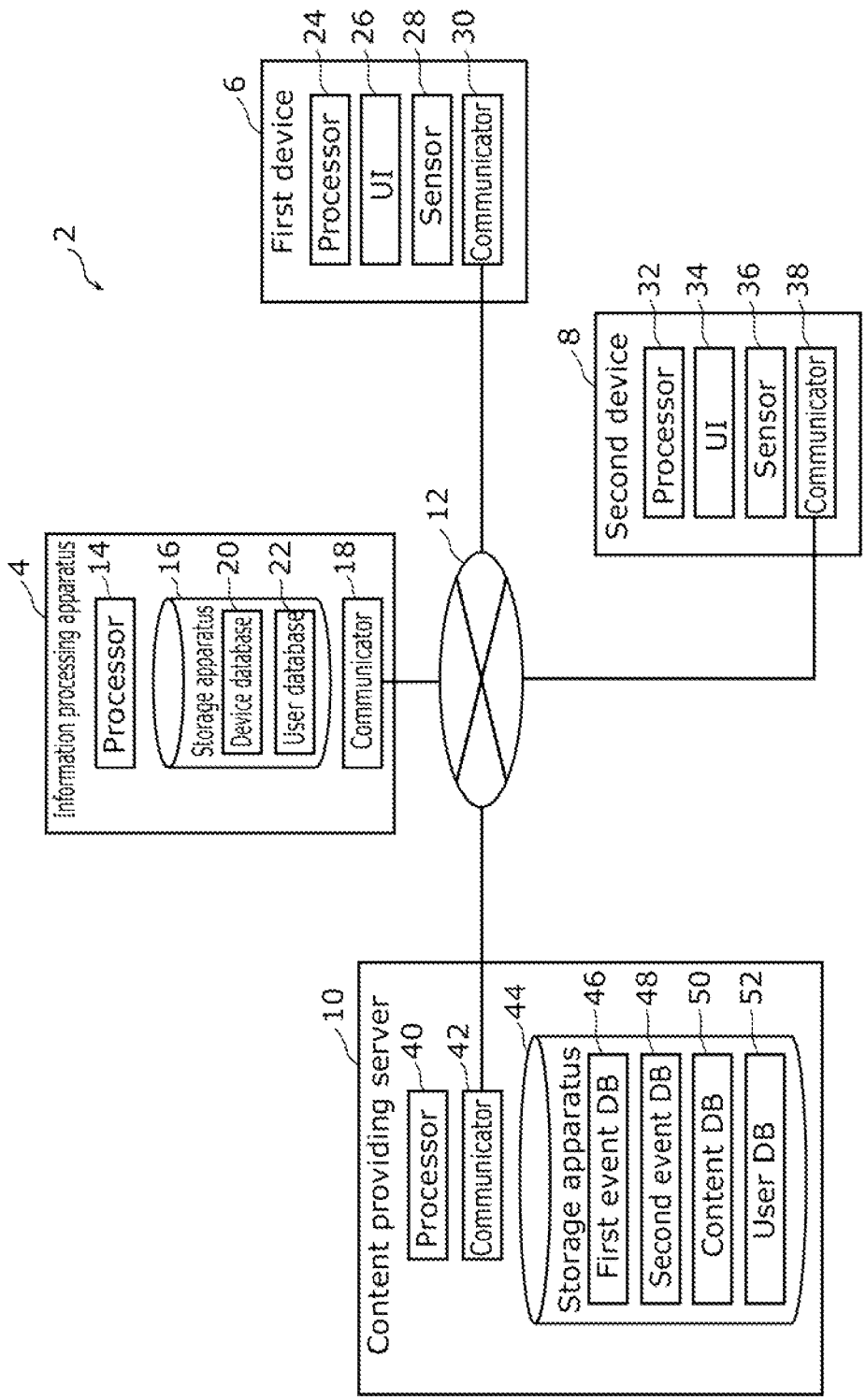
FIG. 1 is a block diagram illustrating a configuration of a system according to an embodiment.

A control method according to one aspect is a control method in a system including at least one processor and a storage apparatus. The control method causes the at least one processor to perform the following: transmitting detection information and user information to a network, the detection information being detected by a first device, the user information being related to a user and obtained by a second device; determining that a first event occurred based on the detection information and the user information, the first event being any one of a plurality of events stored in the storage apparatus, the first event being an event that potentially causes a problem in at least one of a home of the user, property owned by the user, a service expected by the user, or a physical body of the user; determining content based on the first event, the content being at least one of a product for addressing the problem, a service for addressing the problem, or insurance that provides compensation for damages incurred by the user if the problem were to actually occur; and notifying the user of the content by transmitting data indicating the content to the first device or the second device via the network after elapse of a given amount of time from an occurrence of the first event, the given amount of time being predetermined per event included in the plurality of events.

According to this aspect, a first event is determined to have occurred based on detection information detected by the first device and user information obtained by the second device. Content is determined based on the first event, and after elapse of a given amount of time—which is predetermined per event—from occurrence of the first event, the user is notified of the content by transmission of data indicating the content to the first device or the second device. This makes it possible to notify the user of content optimal for recommendation to the user, at an optimal timing. This in turn makes it possible to improve the customer appeal of the content to the user.

For example, the storage apparatus may include, as attribute information indicating an attribute of the first event, information indicating at least one of a category, a degree of urgency, and a location of occurrence, and the given amount of time may vary depending on the attribute information.

According to this aspect, it is possible to notify the user of the content at an optimal timing since the given amount of time varies according to the attribute information (at least one of a category, a degree of urgency, or a location of occurrence) corresponding to the first event.

For example, the at least one processor may notify the user of the content by transmitting the data to the first device or the second device before a time of occurrence of a second event similar to the first event.

According to this aspect, the data is transmitted to the first device or the second device before the time of occurrence of the second event that is similar to the first event. This makes it possible to notify the user of the content upon the user feeling, for example, uneasy as a result of the occurrence of the first event. This in turn makes it possible to effectively improve the customer appeal of the content to the user.

For example, the at least one processor may notify the user of the content by transmitting the data to the first device or the second device after a time of occurrence of a second event similar to the first event.

According to this aspect, the data is transmitted to the first device or the second device after the time of occurrence of the second event that is similar to the first event. This makes it possible to notify the user of the content upon the user feeling, for example, uneasy as a result of the occurrence of the second event occurring after the first event. This in turn makes it possible to effectively improve the customer appeal of the content to the user.

For example, the given amount of time may be determined based on the first event and the second event.

According to this aspect, the user can be notified of the content at an optimal timing by setting the given amount of time taking both the first event and the second event into account.

For example, the at least one processor may notify the user of the content by transmitting the data to the first device or the second device at least once before a time of occurrence of a second event similar to the first event and at least once after the time of occurrence of the second event.

According to this aspect, even when a conversion does not occur after notifying the user of the content before the time of occurrence of the second event, the probability of a successful conversion is increased by notifying the user of the content once again after the time of occurrence of the second event. This in turn makes it possible to effectively improve the customer appeal of the content to the user.

For example, the at least one processor may determine that the second event occurred based on the detection information and the user information.

According to this aspect, it is possible to more accurately determine the occurrence of the second event.

For example, the at least one processor may be included in a server or a client.

An information processing apparatus according to one aspect of the present disclosure is capable of communicating with a first device and a second device via a network, and includes a processor and a storage apparatus. Using the storage apparatus, the processor: transmits detection information and user information to the network, the detection information being detected by the first device, the user information being related to a user and obtained by the second device; when the processor determines that a first event occurred based on the detection information and the user information, receives data indicating content via the network after elapse of a given amount of time from an occurrence of the first event, the first event being any one of a plurality of events that are predefined, the first event being an event that potentially causes a problem in at least one of a home of the user, property owned by the user, a service expected by the user, or a physical body of the user, the content being at least one of a product for addressing the problem, a service for addressing the problem, or insurance that provides compensation for damages incurred by the user if the problem were to actually occur, and the given amount of time being predetermined per event included in the plurality of events; and notifies the user of the content by transmitting the data received to the first device or the second device via the network.

According to this aspect, a first event is determined to have occurred based on detection information detected by the first device and user information obtained by the second device, and content is determined based on the first event. After elapse of a given amount of time—which is predetermined per event—from occurrence of the first event, the user is notified of the content by transmission of data indicating the content to the first device or the second device. This makes it possible to notify the user of content optimal for recommendation to the user, at an optimal timing. This in turn makes it possible to improve the customer appeal of the content to the user.

General or specific aspects of the present disclosure may be realized as a system, a method, an integrated circuit, a computer program, a computer-readable recording medium such as a CD-ROM, or any given combination thereof.

Hereinafter, an embodiment is specifically described with reference to the drawings.

The following embodiment describes a general or specific example. The numerical values, shapes, materials, elements, the arrangement and connection of the elements, steps, order of the steps, etc., shown in the following embodiment are mere examples, and therefore do not limit the scope of the claims. Therefore, among elements in the following exemplary embodiment, those not recited in any one of the independent claims defining the broadest scope are described as optional elements.

EMBODIMENT

1. System Configuration

First, the configuration of system 2 according to the embodiment will be described with reference to FIG. 1 through FIG. 4. FIG. 1 is a block diagram illustrating the configuration of system 2 according to the embodiment. FIG. 2 illustrates one example of first event database 46 according to the embodiment. FIG. 3 illustrates one example of second event database 48 according to the embodiment. FIG. 4 illustrates one example of content database 50 according to the embodiment.

As illustrated in FIG. 1, system 2 includes information processing apparatus 4, first device 6, second device 8, and content providing server 10. Each of information processing apparatus 4, first device 6, second device 8, and content providing server 10 is connected to network 12. Note that network 12 encompasses both an in-home network and an out-of-home network.

Information processing apparatus 4 is, for example, a home server disposed in a home, and manages and controls devices (including first device 6 and second device 8) connected to network 12 (in-home network). Note that information processing apparatus 4 may identify devices to be managed based on whether they are on the same in-home network or not, and, alternatively, may identify devices to be managed based on whether they possess the same account or same service set identifier (SSID).

Information processing apparatus 4 includes processor 14, storage apparatus 16, and communicator 18. Processor 14 executes various processes for controlling information processing apparatus 4, using storage apparatus 16. Storage apparatus 16 stores device database (DB) 20 and user database (DB) 22. Device database 20 is a database indicating association between devices connected to network 12 (in-home network) and users that use the devices. User database 22 is a database indicating information related to a user of a device, such as the user's sex, age, family structure, in-home time, out-of-home time, home return time, and device usage history. Communicator 18 transmits and receives various data between first device 6 and second device 8 via network 12. Communicator 18 also transmits and receives various data to and from content providing server 10 via network 12.

First device 6 is connected to information processing apparatus 4 via network 12. First device 6 is a device used by the user, and is, for example, any sort of household appliance such as a television receiver, refrigerator, or washing machine. First device 6 detects detection information and transmits the detected detection information to information processing apparatus 4 via network 12. The detection information is information that potentially leads to some sort of problem from the perspective of the user, and is, for example, information related to a device connected to the in-home network, a noise, a voice, or a person.

First device 6 includes processor 24, user interface (UI) 26, sensor 28, and communicator 30. Processor 24 executes various processes for controlling first device 6. User interface 26 is, for example, a touch panel or a microphone. Sensor 28 is, for example, a camera that detects infrared light, ultrasound waves, or visible light, or a microphone that collects sound. Communicator 30 transmits and receives various data to and from information processing apparatus 4 via network 12. Although first device 6 is exemplified as including sensor 28 in this embodiment, first device 6 is not limited to including sensor 28; sensor 28 may be omitted.

Second device 8 is connected to information processing apparatus 4 via network 12. Second device 8 is a device used by the user, and is, for example, any sort of household appliance such as a smartphone, tablet terminal, or personal computer. Second device obtains user information and transmits the obtained user information to information processing apparatus 4 via network 12. The user information is information related to a user activity ascribable to the detection information described above.

Second device 8 includes processor 32, user interface (UI) 34, sensor 36, and communicator 38. Processor 32 executes various processes for controlling second device 8. User interface 34 is, for example, a touch panel or a microphone. Sensor 36 is, for example, a camera that detects infrared light, ultrasound waves, or visible light, or a microphone that collects sound. Communicator 38 transmits and receives various data to and from information processing apparatus 4 via network 12.

Content providing server 10 is a server for delivering content to recommend to the user, and is, for example, a cloud server disposed outside the home. Content providing server 10 includes processor 40, communicator 42, and storage apparatus 44. Processor 40 executes various processes for controlling content providing server 10, using storage apparatus 44. Communicator 42 transmits and receives various data to and from information processing apparatus 4 via network 12. Storage apparatus 44 stores first event database (DB) 46, second event database (DB) 48, content database (DB) 50, and user database (DB) 52.

First event database 46 is, for example, as illustrated in FIG. 2, a database including, as attribute information indicating attributes of a first event (Events A through L), for example, a category, a degree of urgency, a location of occurrence, and a timing of transmission of content data (one example of data) when the first event occurs. The first event is, for example, an event that potentially causes a problem in at least one of a home of the user, property owned by the user, a service expected by the user, or the physical body of the user. The content data transmission timing is predetermined per Event A through L, and varies depending on the attribute information (category, degree of urgency, and location of occurrence) of the first event. Stated differently, the content data transmission timing is the timing of the transmission of content data to first device 6 or second device 8 via network 12 that is reached after elapse of a given amount of time—which is predetermined per Event A through L—from an occurrence of the first event. For example, as illustrated in FIG. 2, the content data transmission timing in the case that Event A occurs is later than the content data transmission timing in the case that Event B, which has a higher degree of urgency than Event A, occurs.

Second event database 48 is, for example, as illustrated in FIG. 3, a database indicating association between a second event, a first event related to the second event, and a timing of transmission of content data in the case that the second event occurs. The second event is an event similar to the first event.

Content database 50 is, for example, as illustrated in FIG. 4, a data table indicating association between detection information, user information, a first event, and content. The content is, for example, at least one of a product for addressing the problem, a service for addressing the problem, or insurance that provides compensation for damages incurred by the user in the event that the problem were to actually occur.

Note that the content may be a notification to the user of the completion of an actual electronic transaction, and may be an advertisement for access to a given service provider. When the content is an advertisement, content providing server 10 may obtain the content from an advertisement agency.

User database 52 is a database indicating information related to a user of a device, such as the user's sex, age, family structure, activity history, purchase history, and schedule.

2. System Operations

Figure 5:
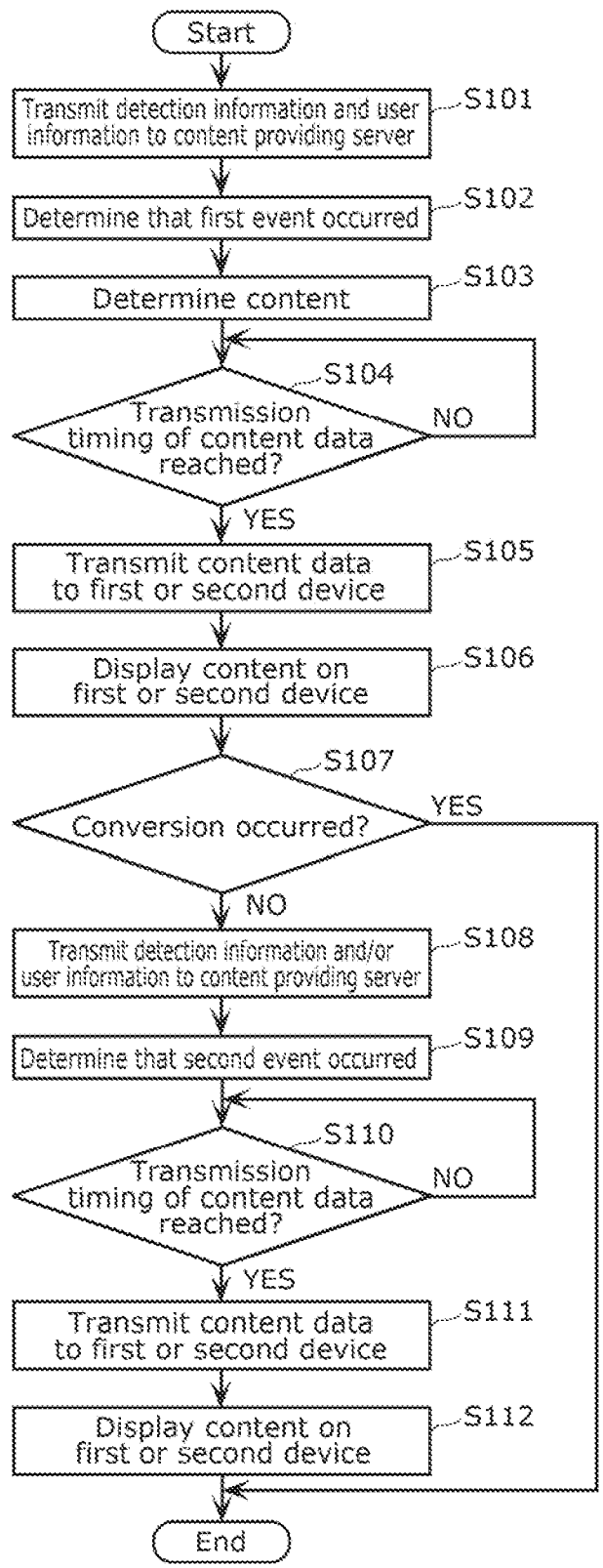
FIG. 5 is a flow chart illustrating a flow of processes performed by the system according to the embodiment.

Next, operations performed by system 2 according to the embodiment will be described with reference to FIG. 5. FIG. 5 is a flow chart illustrating the flow of processes performed by system 2 according to the embodiment.

First device 6 detects detection information and transmits the detected detection information to information processing apparatus 4 via network 12. Second device 8 obtains user information and transmits the obtained user information to information processing apparatus 4 via network 12. Information processing apparatus 4 transmits the detection information from first device 6 and the user information from second device 8 to content providing server 10 via network 12 (S101).

Content providing server 10 receives the detection information and the user information from information processing apparatus 4. Content providing server 10 determines that the first event occurred based on the received detection information and user information (S102). More specifically, content providing server 10 refers to content database 50 illustrated in FIG. 4 and identifies, as the first event, an event among Events A through L that corresponds to the received detection information and user information.

Content providing server 10 determines content to recommend to the user based on the identified first event (S103). More specifically, content providing server 10 refers to content database 50 illustrated in FIG. 4 and determines to recommend the content corresponding to the identified first event.

Content providing server 10 refers to first event database 46 illustrated in FIG. 2 and determines whether the transmission timing of the content data corresponding to the identified first event has been reached or not (S104). In other words, content providing server 10 determines whether a given amount of time predetermined per Event A through L has elapsed since the time of occurrence of the first event. Note that content providing server 10 may identify the time of detection of the detection information by first device 6 or the time of obtainment of the user information by second device 8 as the time of occurrence of the first event.

When the content data transmission timing has not been reached (NO in S104), processing returns to step S104. However, when the content data transmission timing has been reached (YES in S104), content providing server 10 transmits the content data indicating the determined content to information processing apparatus 4 via network 12. Information processing apparatus 4 transmits the content data received from content providing server 10 to first device 6 (or second device 8) via network 12 (S105).

First device 6 (or second device 8) receives the content data from information processing apparatus 4, and displays the content indicated by the received content data (S106). This notifies the user of the content.

When a conversion occurs as a result of the user viewing the content displayed on first device 6 (or second device 8) and operating first device 6 (or second device 8) (YES in S107), the processing by system 2 ends. Note that customer appeal can be measured by evaluating conversion. As used herein, "conversion" refers to an action taken by the user in response to the provided content. For example, when the content is a product or service, a conversion is, for example, an inquiry about or purchase of the product or service, and when the content is insurance, a conversion is, for example, an inquiry about or enrollment in the insurance. In other words, customer appeal can be evaluated based on whether or not the number of conversions or conversion rate for the provided content increased or not.

When a conversion does not occur (NO in S107), the user is notified of the content again when the second event similar to the first event occurs, as described below.

First device 6 detects detection information and transmits the detected detection information to information processing apparatus 4 via network 12. Second device 8 obtains user information and transmits the obtained user information to information processing apparatus 4 via network 12. Information processing apparatus 4 transmits the detection information from first device 6 and/or the user information from second device 8 to content providing server 10 via network 12 (S108).

Content providing server 10 receives the detection information and/or the user information from information processing apparatus 4. Content providing server 10 determines that the second event occurred based on the received detection information and/or user information (S109). More specifically, content providing server 10 refers to second event database 48 illustrated in FIG. 3 and identifies the second event that corresponds to the received detection information and/or user information.

Content providing server 10 refers to second event database 48 illustrated in FIG. 3 and determines whether the transmission timing of the content data corresponding to the identified second event has been reached or not (S110). In other words, content providing server 10 determines whether a given amount of time predetermined per second event has elapsed since the time of occurrence of the second event. Note that content providing server 10 may identify the time of detection of the detection information by first device 6 or the time of obtainment of the user information by second device 8 as the time of occurrence of the second event.

When the content data transmission timing has not been reached (NO in S110), processing returns to step S110. However, when the content data transmission timing has been reached (YES in S110), content providing server 10 transmits the content data indicating the content to information processing apparatus 4 via network 12. Information processing apparatus 4 transmits the content data received from content providing server 10 to first device 6 (or second device 8) via network 12 (S111).

First device 6 (or second device 8) receives the content data from information processing apparatus 4, and displays the content indicated by the received content data (S112). This notifies the user of the content again.

3. Use Cases

Figure 6:
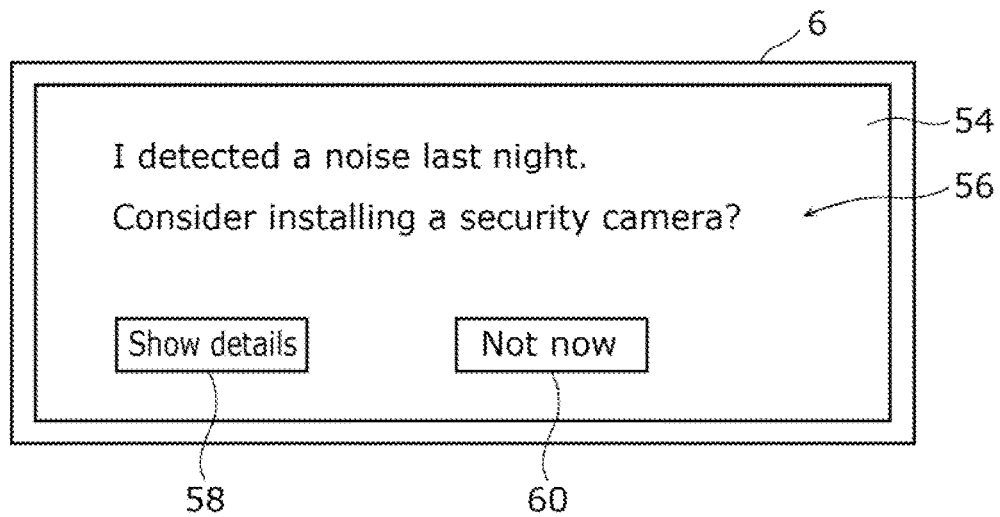
FIG. 6 illustrates one example of content displayed on a first device according to the embodiment in use case 1.
Figure 7:
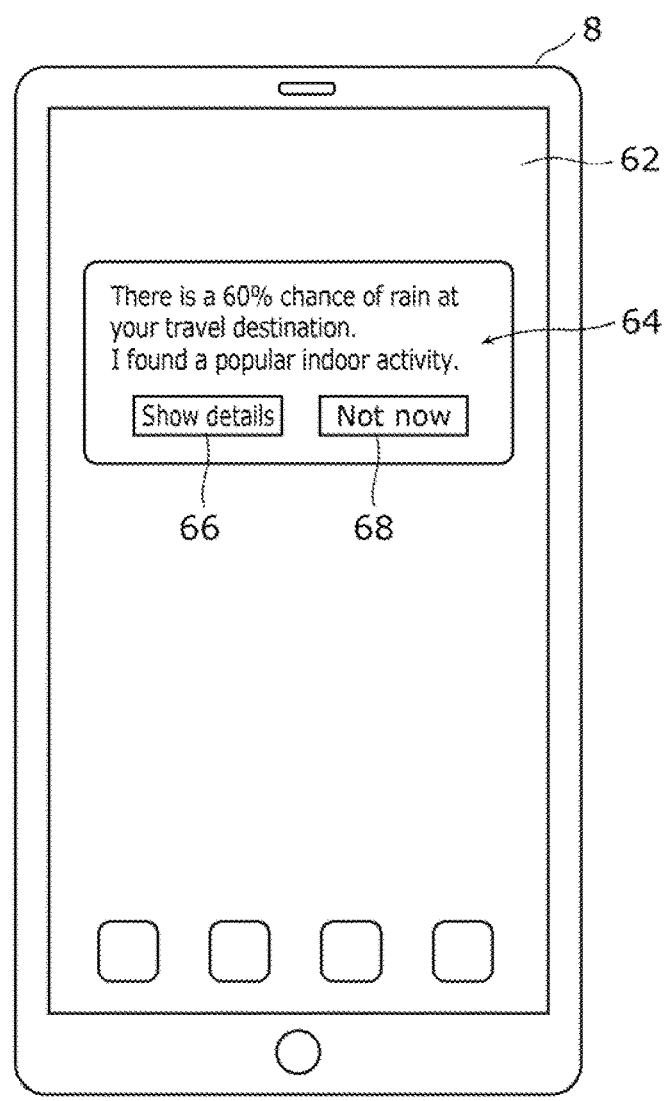
FIG. 7 illustrates one example of content displayed on a second device according to the embodiment in use case 8.

Hereinafter, uses cases for system 2 according to the embodiment will be described with reference to FIG. 3 through FIG. 7. FIG. 6 illustrates one example of content displayed on first device 6 according to the embodiment in use case 1. FIG. 7 illustrates one example of content displayed on second device 8 according to the embodiment in use case 8.

3-1. Use Case 1

Use case 1 is a case in which a first event defined as follows occurs: the user, asleep at night, is startled and woken up by a noise, turns on the bedroom light, determines nothing is amiss, turns off the bedroom light and goes back to sleep.

In use case 1, sensor 28 (for example, a microphone) of first device 6 detects a noise made at night as the detection information. Sensor 36 (for example, a camera) of second device 8 obtains, as user information, information indicating that the bedroom light switch was switched on and then switched off. Sensor 36 of second device 8 may detect the switching on and switching off of the light switch based on a change in current supplied to the light.

The detection information from first device 6 and the user information from second device 8 are transmitted to content providing server 10 via information processing apparatus 4. Content providing server 10 refers to content database 50 illustrated in FIG. 4, identifies Event A as the first event from among Events A through L since Event A corresponds to the detection information from first device 6 indicating a noise at night and the user information from second device 8 indicating the light switch being switched on and then off, and thus determines that Event A has occurred.

In first event database 46 illustrated in FIG. 2, Event A is associated with a category of "attempted break-in", a degree of urgency of "low", a location of occurrence of "home/bedroom", and a content data transmission timing of "tomorrow afternoon". Content providing server 10 refers to first event database 46 and determines whether the content data transmission timing corresponding to Event A has been reached or not.

Content providing server 10 refers to content database 50 illustrated in FIG. 4 and determines that the content corresponding to Event A is "security camera/home security service/theft insurance".

With this, on the afternoon of the next day after Event A occurred, content providing server 10 transmits content data indicating content related to, for example, a security camera, to information processing apparatus 4. Content providing server 10 determines whether it is the afternoon of the next day after Event A occurred by using a timer to count how much time has elapsed from the time of detection of the detection information from first device 6. Information processing apparatus 4 transmits the content data from content providing server 10 to, for example, first device 6. First device 6 receives the content data from information processing apparatus 4, and displays the content indicated by the received content data. This notifies the user of the content.

As illustrated in FIG. 6, content 56 of, for example, "Consider installing a security camera?" is displayed on display 54 (functioning as user interface 26) of first device 6. In the example illustrated in FIG. 6, information indicating Event A, for example, "I detected a noise last night" is also displayed along with content 56 on display 54 of first device 6. Note that displaying information indicating the first event on display 54 of first device 6 may be optional. Moreover, information indicating a similar first event that occurred in the past (for example, Event B) may be displayed along with content 56 on display 54 of first device 6.

When a conversion occurs as a result of the user pressing button 58 "Show details" displayed on display 54 of first device 6, display 54 transitions to, for example, a web page introducing a security camera product.

However, when a conversion does not occur as a result of the user pressing button 60 "Not now" displayed on display 54 of first device 6, display 54 transitions to, for example, the home screen. In this case, if a second event similar to Event A occurs, the user is notified of the content again. Here, the second event is a noise being made at night.

Sensor 28 of first device 6 detects a noise at night as the detection information. The detection information from first device 6 is transmitted to content providing server 10 via information processing apparatus 4. Content providing server 10 refers to second event database 48 illustrated in FIG. 3 and, based on the detection information from first device 6, determines that a noise was made at night, as a second event related to Event A.

In second event database 48 illustrated in FIG. 3, the content data transmission timing associated with the second event "a noise at night" is "immediately after occurrence of the second event". Content providing server 10 refers to second event database 48 and determines whether the content data transmission timing has been reached or not.

With this, content providing server 10 transmits content data indicating content related to, for example, a security camera, to information processing apparatus 4 immediately after occurrence of the second event (i.e., immediately after the noise is made at night). Information processing apparatus 4 transmits the content data from content providing server 10 to, for example, first device 6. First device 6 receives the content data from information processing apparatus 4, and displays the content indicated by the received content data. This notifies the user of the content again.

3-2. Use Case 2

Use case 2 is a case in which a first event defined as follows occurs: the user, asleep at night, is startled and woken up by a noise, screams, turns on the bedroom light, determines nothing is amiss, turns off the bedroom light and goes back to sleep.

In use case 2, sensor 28 (for example, a microphone) of first device 6 detects a noise at night as the detection information. Sensor 36 (for example, a microphone and a camera) of second device 8 obtains, as user information, information indicating that the user screamed and the bedroom light switch was switched on and then switched off. Note that the user's scream is detected using, for example, a technique of analyzing voice data obtained by a microphone and performing voice recognition or voice authentication. This process may be executed by information processing apparatus 4, and, alternatively, may be executed by content providing server 10. In the process, the obtained voice data may be compared with voice data corresponding to the user that is stored in advance. Alternatively, voice data corresponding to a plurality of people, such as voice data for an adult and voice data for a child may be stored in advance, and the obtained voice data may be compared with this stored voice data to improve the accuracy of the recognition processing for determining whose voice it is or whether it is a noise or not.

The detection information from first device 6 and the user information from second device 8 are transmitted to content providing server 10 via information processing apparatus 4. Content providing server 10 refers to content database 50 illustrated in FIG. 4, identifies Event B as the first event from among Events A through L since Event B corresponds to the detection information from first device 6 indicating a noise at night and the user information from second device 8 indicating a scream followed by the light switch being switched on and then off, and thus determines that Event B has occurred.

In first event database 46 illustrated in FIG. 2, Event B is associated with a category of "attempted break-in", a degree of urgency of "medium", a location of occurrence of "home/bedroom", and a content data transmission timing of "tomorrow morning". In other words, compared to use case 1 described above, in use case 2, the degree of urgency is higher and the content data is transmitted earlier. Content providing server 10 refers to first event database 46 and determines whether the content data transmission timing corresponding to Event B has been reached or not.

Content providing server 10 refers to content database 50 illustrated in FIG. 4 and determines that the content corresponding to Event B is "security camera/home security service/theft insurance".

With this, on the morning of the next day after Event B occurred, content providing server 10 transmits content data indicating content related to, for example, a security camera, to information processing apparatus 4. Content providing server 10 determines whether it is the morning of the next day after Event B occurred by using a timer to count how much time has elapsed from the time of detection of the detection information from first device 6. Information processing apparatus 4 transmits the content data from content providing server 10 to, for example, first device 6. First device 6 receives the content data from information processing apparatus 4, and displays the content indicated by the received content data. This notifies the user of the content. As the flow of subsequent processes are the same as in use case 1 described above, repeated description is omitted.

3-3. Use Case 3

Use case 3 is a case in which a first event defined as follows occurs: the user learns of news related to a break-in in the neighborhood, feels uneasy, and searches for news related to the break-in.

In use case 3, communicator 30 of first device 6 detects, as the detection information, the reception of news related to a break-in in the user's neighborhood via the internet or the like. Communicator 38 of second device 8 obtains, as the user information, information indicating that the user searched the internet or the like for news related to the break-in.

The detection information from first device 6 and the user information from second device 8 are transmitted to content providing server 10 via information processing apparatus 4. Content providing server 10 refers to content database 50 illustrated in FIG. 4, identifies Event C as the first event from among Events A through L since Event C corresponds to the detection information from first device 6 indicating reception of news of a break-in and the user information from second device 8 indicating the user searched for news of the break-in, and thus determines that Event C has occurred.

In first event database 46 illustrated in FIG. 2, Event C is associated with a category of "attempted break-in", a degree of urgency of "high", a location of occurrence of a "nearby home", and a content data transmission timing of "immediately after searching". Content providing server 10 refers to first event database 46 and determines whether the content data transmission timing corresponding to Event C has been reached or not.

Content providing server 10 refers to content database 50 illustrated in FIG. 4 and determines that the content corresponding to Event C is "security camera/home security service/theft insurance".

With this, immediately after the user searches for news related to the break-in, content providing server 10 transmits content data indicating content related to, for example, theft insurance, to information processing apparatus 4. Note that content providing server 10 determines whether the user searched for news related to the break-in based on the detection information from first device 6. Information processing apparatus 4 transmits the content data from content providing server 10 to, for example, first device 6. First device 6 receives the content data from information processing apparatus 4, and displays the content indicated by the received content data (for example, content of "Consider enrolling in theft insurance?"). This notifies the user of the content.

When a conversion does not occur in response to notifying the user of the content, if a second event similar to Event C occurs, the user is notified of the content again. Here, the second event is the reception of news of a different break-in.

Communicator 30 of first device 6 detects, as the detection information, the reception of news related to a different break-in in the user's neighborhood via the internet or the like. The detection information from first device 6 is transmitted to content providing server 10 via information processing apparatus 4. Content providing server 10 refers to second event database 48 illustrated in FIG. 3 and, based on the detection information from first device 6, determines that news of a different break-in has been received, as a second event related to Event C.

In second event database 48 illustrated in FIG. 3, the content data transmission timing associated with the second event "reception of news of a different break-in" is "immediately after occurrence of the second event". Content providing server 10 refers to second event database 48 and determines whether the content data transmission timing has been reached or not.

With this, content providing server 10 transmits content data indicating content related to, for example, theft insurance, to information processing apparatus 4 immediately after occurrence of the second event (i.e., immediately after reception of news of a different break-in). Information processing apparatus 4 transmits the content data from content providing server 10 to, for example, first device 6. First device 6 receives the content data from information processing apparatus 4, and displays the content indicated by the received content data. This notifies the user of the content again.

Although the second event is exemplified as the reception of news of a different break-in in use case 3, the second event may be, for example, the posting of information related to the break-in on a social networking service (SNS) by an acquaintance that lives in the user's neighborhood. The data from the SNS may be obtained via an application programming interface (API), and credentials for accessing the SNS may be stored in, for example, user database 22 and/or 52.

3-4. Use Case 4

Use case 4 is a case in which a first event defined as follows occurs: the user became uneasy after experiencing shaking from an earthquake, but calmed down after searching for news related to the earthquake.

In use case 4, communicator 30 of first device 6 detects, as the detection information, the reception of news related to an earthquake via the internet or the like. Communicator 38 of second device 8 obtains, as the user information, information indicating that the user searched the internet or the like for news related to the earthquake. Sensor 36 (for example, a camera) of second device 8 obtains, as the user information, information indicating that the user has not left their home.

The detection information from first device 6 and the user information from second device 8 are transmitted to content providing server 10 via information processing apparatus 4. Content providing server 10 refers to content database 50 illustrated in FIG. 4, identifies Event D as the first event from among Events A through L since Event D corresponds to the detection information from first device 6 indicating reception of news of an earthquake and the user information from second device 8 indicating the user searched for news of the earthquake and does not leave their home, and thus determines that Event D has occurred.

In first event database 46 illustrated in FIG. 2, Event D is associated with a category of "earthquake (minor)", a degree of urgency of "low", a location of occurrence of "home", and a content data transmission timing of "after the user calms down". Content providing server 10 refers to first event database 46 and determines whether the content data transmission timing corresponding to Event D has been reached or not.

Content providing server 10 refers to content database 50 illustrated in FIG. 4 and determines that the content corresponding to Event D is "disaster goods/earthquake insurance".

With this, after the user calms down (for example, after the user finishes a meal), content providing server 10 transmits content data indicating content related to, for example, earthquake insurance, to information processing apparatus 4. Note that content providing server 10 determines whether the user has calmed down or not based on image data of the user captured by sensor 36 (for example, a camera) of second device 8. Information processing apparatus 4 transmits the content data from content providing server 10 to, for example, first device 6. First device 6 receives the content data from information processing apparatus 4, and displays the content indicated by the received content data (for example, content of "Consider enrolling in earthquake insurance?"). This notifies the user of the content.

When a conversion does not occur in response to notifying the user of the content, if a second event similar to Event D occurs, the user is notified of the content again. Here, the second event is the reception of news related to the earthquake.

Communicator 30 of first device 6 detects, as the detection information, the reception of news related to the earthquake via the internet or the like. The detection information from first device 6 is transmitted to content providing server 10 via information processing apparatus 4. Content providing server 10 refers to second event database 48 illustrated in FIG. 3 and, based on the detection information from first device 6, determines that news related to the earthquake has been received, as a second event related to Event D.

In second event database 48 illustrated in FIG. 3, the content data transmission timing associated with the second event "reception of news related to the earthquake" is "after the shaking subsides and the user has calmed down". Content providing server 10 refers to second event database 48 and determines whether the content data transmission timing has been reached or not.

With this, after the shaking from the earthquake subsides and the user calms down (for example, after the user finishes a meal), content providing server 10 transmits content data indicating content related to, for example, earthquake insurance, to information processing apparatus 4. Information processing apparatus 4 transmits the content data from content providing server 10 to, for example, first device 6. First device 6 receives the content data from information processing apparatus 4, and displays the content indicated by the received content data. This notifies the user of the content again.

3-5. Use Case 5

Use case 5 is a case in which a first event defined as follows occurs: a child almost gets into a dangerous situation.

In use case 5, sensor 28 (for example, a microphone) of first device 6 detects a noise and a child's crying voice as the detection information. Sensor 36 (for example, a microphone) of second device 8 obtains, as the user information, a parent's startled voice, such as a parent asking "are you okay?!".

The detection information from first device 6 and the user information from second device 8 are transmitted to content providing server 10 via information processing apparatus 4. Content providing server 10 refers to content database 50 illustrated in FIG. 4, identifies Event E as the first event from among Events A through L since Event E corresponds to the detection information from first device 6 of a noise and a child's crying voice and the user information from second device 8 of a parent's startled voice, and thus determines that Event E has occurred.

In first event database 46 illustrated in FIG. 2, Event E is associated with a category of "accident", a degree of urgency of "medium", a location of occurrence of "living room", and a content data transmission timing of "after the child stops crying and the parent calms down". Content providing server 10 refers to first event database 46 and determines whether the content data transmission timing corresponding to Event E has been reached or not.

Content providing server 10 refers to content database 50 illustrated in FIG. 4 and determines that the content corresponding to Event E is "safety goods/non-life insurance".

With this, after the child stops crying and the parent calms down, content providing server 10 transmits content data indicating content related to, for example, safety goods, to information processing apparatus 4. Note that content providing server 10 determines whether the child stopped crying based on the detection information from first device 6. Moreover, content providing server 10 determines whether the parent has calmed down or not based on image data of the parent captured by sensor 36 (for example, a camera) of second device 8. Information processing apparatus 4 transmits the content data from content providing server 10 to, for example, first device 6. First device 6 receives the content data from information processing apparatus 4, and displays the content indicated by the received content data (for example, content of "Consider purchasing safety goods?"). This notifies the user of the content.

When a conversion does not occur in response to notifying the user of the content, if a second event similar to Event E occurs, the user is notified of the content again. Here, the second event is a noise and a child's crying voice.

Sensor 28 of first device 6 detects a noise and a child's crying voice as the detection information. The detection information from first device 6 is transmitted to content providing server 10 via information processing apparatus 4. Content providing server 10 refers to second event database 48 illustrated in FIG. 3 and, based on the detection information from first device 6, determines that "a noise and a child's crying voice" occurred, as a second event related to Event E.

In second event database 48 illustrated in FIG. 3, the content data transmission timing associated with the second event "a noise and a child's crying voice" is "after the child stops crying and the parent calms down". Content providing server 10 refers to second event database 48 and determines whether the content data transmission timing has been reached or not.

With this, after the child stops crying and the parent calms down, content providing server 10 transmits content data indicating content related to, for example, safety goods, to information processing apparatus 4. Information processing apparatus 4 transmits the content data from content providing server 10 to, for example, first device 6. First device 6 receives the content data from information processing apparatus 4, and displays the content indicated by the received content data. This notifies the user of the content again.

3-6. Use Case 6

Use case 6 is a case in which a first event defined as follows occurs: the user cannot enroll in accident insurance for the coming year because the user sustained an injury.

In use case 6, sensor 28 (for example, a microphone) of first device 6 detects a noise (for example, the sound of the user falling down in their home) as the detection information. Communicator 38 of second device 8 obtains, as the user information, information indicating that the user searched the internet or the like for a hospital.

The detection information from first device 6 and the user information from second device 8 are transmitted to content providing server 10 via information processing apparatus 4. Content providing server 10 refers to content database 50 illustrated in FIG. 4, identifies Event F as the first event from among Events A through L since Event F corresponds to the detection information from first device 6 of a noise and the user information from second device 8 indicating the user searched for a hospital, and thus determines that Event F has occurred.

In first event database 46 illustrated in FIG. 2, Event F is associated with a category of "injury/accident", a degree of urgency of "low", a location of occurrence of "home/kitchen/yard", and a content data transmission timing of "one year later". Content providing server 10 refers to first event database 46 and determines whether the content data transmission timing corresponding to Event F has been reached or not.

Content providing server 10 refers to content database 50 illustrated in FIG. 4 and determines that the content corresponding to Event F is "accident insurance".

With this, one year after Event F occurred, content providing server 10 transmits content data indicating content related to, for example, accident insurance, to information processing apparatus 4. Content providing server 10 determines whether one year has elapsed since Event F occurred by using a timer to count how much time has elapsed from the time of detection of the detection information from first device 6 (or from the time of obtainment of the user information from second device 8). Information processing apparatus 4 transmits the content data from content providing server 10 to, for example, first device 6. First device 6 receives the content data from information processing apparatus 4, and displays the content indicated by the received content data (for example, content of "Consider enrolling in accident insurance?"). This notifies the user of the content.

When a conversion does not occur after notifying the user of the content, if a second event similar to Event F occurs, the user is notified of the content again. Here, the second event is a noise.

Sensor 28 of first device 6 detects a noise (for example, the sound of the user falling down in their home) as the detection information. The detection information from first device 6 is transmitted to content providing server 10 via information processing apparatus 4. Content providing server 10 refers to second event database 48 illustrated in FIG. 3 and, based on the detection information from first device 6, determines that a noise was made, as a second event related to Event F.

In second event database 48 illustrated in FIG. 3, the content data transmission timing associated with the second event "a noise" is "at least one year later and immediately after occurrence of the second event". Content providing server 10 refers to second event database 48 and determines whether the content data transmission timing has been reached or not.

With this, content providing server 10 transmits content data indicating content related to, for example, accident insurance, to information processing apparatus 4 at a point in time that is at least one year after the time of occurrence of the first event and immediately after the occurrence of the second event (i.e., immediately after the noise is made). Information processing apparatus 4 transmits the content data from content providing server 10 to, for example, first device 6. First device 6 receives the content data from information processing apparatus 4, and displays the content indicated by the received content data. This notifies the user of the content again.

Although communicator 38 of second device 8 is exemplified as obtaining information indicating that the user searched the internet or the like for a hospital as the user information in use case 6, this example is non-limiting. For example, information indicating that the user called a hospital may be obtained as the user information.

3-7. Use Case 7

Use case 7 is a case in which a first event defined as follows occurs: the user's health checkup results indicate that the user's health is within normal limits but has worsened, and the user has searched for a schedule of their next health checkup.

In use case 7, communicator 30 of first device 6 detects, as the detection information, the user's health checkup results received via the internet or the like (results indicating that the user's health is within normal limits but has worsened). Communicator 38 of second device 8 obtains, as the user information, information indicating that the user searched the internet or the like for a schedule of their next health checkup.

The detection information from first device 6 and the user information from second device 8 are transmitted to content providing server 10 via information processing apparatus 4. Content providing server 10 refers to content database 50 illustrated in FIG. 4, identifies Event G as the first event from among Events A through L since Event G corresponds to the detection information from first device 6 of worse health checkup results and the user information from second device 8 indicating the user searched for their next health checkup, and thus determines that Event G has occurred.

In first event database 46 illustrated in FIG. 2, Event G is associated with a category of "illness/health", a degree of urgency of "high", a location of occurrence of "home/work", and a content data transmission timing of "before the results of the user's next health checkup are released". Content providing server 10 refers to first event database 46 and determines whether the content data transmission timing corresponding to Event G has been reached or not.

Content providing server 10 refers to content database 50 illustrated in FIG. 4 and determines that the content corresponding to Event G is "medical insurance".

With this, before the results of the user's next health checkup are released, content providing server 10 transmits content data indicating content related to, for example, medical insurance, to information processing apparatus 4. Note that content providing server 10 determines whether the results of the user's next health checkup have been released based on the detection information from first device 6. Information processing apparatus 4 transmits the content data from content providing server 10 to, for example, first device 6. First device 6 receives the content data from information processing apparatus 4, and displays the content indicated by the received content data (for example, content of "Consider enrolling in medical insurance?"). At this time, a message of, for example, "you may not be able to enroll in medical insurance if your health checkup results indicate your health has worsened" may be displayed on first device 6 along with the content. This notifies the user of the content.

When a conversion does not occur in response to notifying the user of the content, if a second event similar to Event G occurs, the user is notified of the content again as described below. Here, the second event is the further worsening of the user's health checkup results.

Communicator 30 of first device 6 detects, as the detection information, health checkup results (results indicating that the user's health is within normal limits but has worsened further). The detection information from first device 6 is transmitted to content providing server 10 via information processing apparatus 4. Content providing server 10 refers to second event database 48 illustrated in FIG. 3 and, based on the detection information from first device 6, determines that the user's health checkup results have worsened further, as a second event related to Event G.

In second event database 48 illustrated in FIG. 3, the content data transmission timing associated with the second event "further worsening of the user's health checkup results" is "while the user is looking at the results of their health checkup". Content providing server 10 refers to second event database 48 and determines whether the content data transmission timing has been reached or not.

With this, while the user is looking at the results of their health checkup, content providing server 10 transmits content data indicating content related to, for example, medical insurance, to information processing apparatus 4. Note that content providing server 10 determines whether the user is looking at the results of their health checkup based on the user information from second device 8. Information processing apparatus 4 transmits the content data from content providing server 10 to, for example, first device 6. First device 6 receives the content data from information processing apparatus 4, and displays the content indicated by the received content data. This notifies the user of the content again.

Although communicator 38 of second device 8 is exemplified as obtaining information indicating that the user searched the internet or the like for a schedule of their next health checkup as the user information in use case 7, this example is non-limiting. For example, information indicating that the user searched the internet or the like for information related to health may be obtained as the user information.

Moreover, although the content data transmission timing associated with Event G in first event database 46 is exemplified as "before the results of the user's next health checkup are released" in use case 7, this example is non-limiting. For example, content data transmission timing may be "the day before the user's next health checkup".

3-8. Use Case 8

Use case 8 is a case in which a first event defined as follows occurs: the weather forecast for the destination of the user's upcoming vacation is rain, and the user is searching for a destination for their next vacation.

In use case 8, communicator 30 of first device 6 detects, as the detection information, information indicating that the weather forecast for the destination of the user's upcoming vacation is rain via the internet or the like. Communicator 38 of second device 8 obtains, as the user information, information indicating that the user searched the internet or the like for their next vacation destination.

The detection information from first device 6 and the user information from second device 8 are transmitted to content providing server 10 via information processing apparatus 4. Content providing server 10 refers to content database 50 illustrated in FIG. 4, identifies Event H as the first event from among Events A through L since Event H corresponds to the detection information from first device 6 of a weather forecast for the destination of the user's upcoming vacation of rain and the user information from second device 8 indicating that the user searched for a destination for their next vacation, and thus determines that Event H has occurred.

In first event database 46 illustrated in FIG. 2, Event H is associated with a category of "vacation", a degree of urgency of "high", a location of occurrence of "home/living room", and a content data transmission timing of "during vacation planning". Content providing server 10 refers to first event database 46 and determines whether the content data transmission timing corresponding to Event H has been reached or not.

Content providing server 10 refers to content database 50 illustrated in FIG. 4 and determines that the content corresponding to Event H is "rainy weather travel insurance/a different tour". Note that rainy weather travel insurance is insurance that guarantees a refund of travel costs if it rains at the travel destination.

With this, while the user is searching the internet or the like for their next vacation destination, content providing server 10 transmits content data indicating content related to, for example, a different tour, to information processing apparatus 4. Note that content providing server 10 determines whether the user is searching the internet or the like for their next vacation destination based on the detection information from second device 8. Information processing apparatus 4 transmits the content data from content providing server 10 to, for example, second device 8. Second device 8 receives the content data from information processing apparatus 4, and displays the content indicated by the received content data. This notifies the user of the content.

As illustrated in FIG. 7, display 62 of second device 8 displays, for example, content 64 recommending a different tour to the user: "I found a popular indoor activity". In the example illustrated in FIG. 7, information indicating Event H, for example, "There is a 60% chance of rain at your travel destination" is also displayed along with content 64 on display 62 of second device 8. When a conversion occurs as a result of the user pressing button 66 "Show details" displayed on display 62 of second device 8, display 62 transitions to, for example, a web page introducing a different tour.

However, when a conversion does not occur as a result of the user pressing button 68 "Not now" displayed on display 62 of second device 8, display 62 transitions to, for example, the home screen. In this case, if a second event similar to Event H occurs, the user is notified of the content again. Here, the second event is a weather forecast for the destination of the user's next vacation including a chance of rain of at least 60%.

Communicator 30 of first device 6 detects, as the detection information, information indicating a weather forecast for the destination of the user's next vacation including a chance of rain of at least 60% via the internet or the like. The detection information from first device 6 is transmitted to content providing server 10 via information processing apparatus 4. Content providing server 10 refers to second event database 48 illustrated in FIG. 3 and determines that the weather forecast for the destination of the user's next vacation includes a chance of rain of at least 60%, as a second event related to Event H.

In second event database 48 illustrated in FIG. 3, the content data transmission timing associated with the second event "a weather forecast for the destination of the user's next vacation including a chance of rain of at least 60%" is "immediately after occurrence of the second event". Content providing server 10 refers to second event database 48 and determines whether the content data transmission timing has been reached or not.

With this, content providing server 10 transmits content data indicating content related to, for example, a different tour, to information processing apparatus 4 immediately after occurrence of the second event (i.e., immediately after the weather forecast for the destination of the user's next vacation indicates a chance of rain of at least 60%). Information processing apparatus 4 transmits the content data from content providing server 10 to, for example, second device 8. Second device 8 receives the content data from information processing apparatus 4, and displays the content indicated by the received content data. This notifies the user of the content again.

3-9. Use Case 9

Use case 9 is a case in which a first event defined as follows occurs: the user changed the battery in the fire alarm because the battery depleted.

In use case 9, sensor 28 (for example, a battery sensor) of first device 6 detects that the battery in the fire alarm depleted as the detection information. Sensor 36 (for example, a camera) of second device 8 obtains, as the user information, information indicating that the user changed the battery in the fire alarm.

The detection information from first device 6 and the user information from second device 8 are transmitted to content providing server 10 via information processing apparatus 4. Content providing server 10 refers to content database 50 illustrated in FIG. 4, identifies Event I as the first event from among Events A through L since Event I corresponds to the detection information from first device 6 of depletion of the battery in the fire alarm and the user information from second device 8 indicating that the user changed the battery in the fire alarm, and thus determines that Event I has occurred.

In first event database 46 illustrated in FIG. 2, Event I is associated with a category of "fire", a degree of urgency of "low", a location of occurrence of "home/kitchen", and a content data transmission timing of "after the battery is changed". Content providing server 10 refers to first event database 46 and determines whether the content data transmission timing corresponding to Event I has been reached or not.

Content providing server 10 refers to content database 50 illustrated in FIG. 4 and determines that the content corresponding to Event I is "fire insurance".

With this, when the user changes the battery in the fire alarm, content providing server 10 transmits content data indicating content related to, for example, fire insurance, to information processing apparatus 4. Note that content providing server 10 determines whether the user changed the battery in the fire alarm or not based on image data of the user captured by sensor 36 (for example, a camera) of second device 8. Information processing apparatus 4 transmits the content data from content providing server 10 to, for example, first device 6. First device 6 receives the content data from information processing apparatus 4, and displays the content indicated by the received content data (for example, content of "Consider enrolling in fire insurance?"). This notifies the user of the content. At this time, a message of, for example, "for a limited time only, receive a discount when you enroll" may be displayed on first device 6 along with the content.

When a conversion does not occur in response to notifying the user of the content, if a second event similar to Event I occurs, the user is notified of the content again. Here, the second event is that the battery in the fire alarm depleted.

Sensor 28 of first device 6 detects that the battery in the fire alarm depleted as the detection information. The detection information from first device 6 is transmitted to content providing server 10 via information processing apparatus 4. Content providing server 10 refers to second event database 48 illustrated in FIG. 3 and determines that the battery in the fire alarm has depleted, as a second event related to Event I.

In second event database 48 illustrated in FIG. 3, the content data transmission timing associated with the second event "depletion of the fire alarm battery" is "after the battery is changed". Content providing server 10 refers to second event database 48 and determines whether the content data transmission timing has been reached or not.

With this, after the user changes the battery in the fire alarm, content providing server 10 transmits content data indicating content related to, for example, fire insurance, to information processing apparatus 4. Information processing apparatus 4 transmits the content data from content providing server 10 to, for example, first device 6. First device 6 receives the content data from information processing apparatus 4, and displays the content indicated by the received content data. This notifies the user of the content again.

3-10. Use Case 10

Use case 10 is a case in which a first event defined as follows occurs: the user learns of news related to an arson attack in the neighborhood, feels uneasy, and searches for news related to the arson attack.

In use case 10, communicator 30 of first device 6 detects, as the detection information, the reception of news related to an arson attack in the user's neighborhood via the internet or the like. Communicator 38 of second device 8 obtains, as the user information, information indicating that the user searched the internet or the like for news related to the arson attack.

The detection information from first device 6 and the user information from second device 8 are transmitted to content providing server 10 via information processing apparatus 4. Content providing server 10 refers to content database 50 illustrated in FIG. 4, identifies Event J as the first event from among Events A through L since Event J corresponds to the detection information from first device 6 indicating reception of news of an arson attack in the neighborhood and the user information from second device 8 indicating the user searched for news of the arson attack in the neighborhood, and thus determines that Event J has occurred.

In first event database 46 illustrated in FIG. 2, Event J is associated with a category of "fire", a degree of urgency of "high", a location of occurrence of "neighborhood", and a content data transmission timing of "after searching". Content providing server 10 refers to first event database 46 and determines whether the content data transmission timing corresponding to Event J has been reached or not.

Content providing server 10 refers to content database 50 illustrated in FIG. 4 and determines that the content corresponding to Event J is "fire insurance/fire extinguisher".

With this, after the user searches the internet or the like for news related to the arson attack, content providing server 10 transmits content data indicating content related to, for example, fire insurance, to information processing apparatus 4. Note that content providing server 10 determines whether the user is searching the internet or the like for news related to the arson attack based on the detection information from second device 8. Information processing apparatus 4 transmits the content data from content providing server 10 to, for example, first device 6. First device 6 receives the content data from information processing apparatus 4, and displays the content indicated by the received content data (for example, content of "Consider enrolling in fire insurance?"). This notifies the user of the content.

When a conversion does not occur in response to notifying the user of the content, if a second event similar to Event J occurs, the user is notified of the content again. Here, the second event is the sound of a siren.

Sensor 28 (for example, a microphone) of first device 6 detects the sound of a siren in the user's neighborhood as the detection information. The detection information from first device 6 is transmitted to content providing server 10 via information processing apparatus 4. Content providing server 10 refers to second event database 48 illustrated in FIG. 3 and, based on the detection information from first device 6, determines that the sound of a siren was detected, as a second event related to Event J.

In second event database 48 illustrated in FIG. 3, the content data transmission timing associated with the second event "the sound of a siren" is "immediately after occurrence of the second event". Content providing server 10 refers to second event database 48 and determines whether the content data transmission timing has been reached or not.

With this, content providing server 10 transmits content data indicating content related to, for example, fire insurance, to information processing apparatus 4 immediately after occurrence of the second event (i.e., immediately after detection of the sound of the siren). Information processing apparatus 4 transmits the content data from content providing server 10 to, for example, first device 6. First device 6 receives the content data from information processing apparatus 4, and displays the content indicated by the received content data. This notifies the user of the content again.

Although the content data transmission timing associated with Event J in second event database 48 is exemplified as immediately after occurrence of the second event in use case 10, this example is non-limiting. For example, the content data transmission timing may be when the user is calm. The user may be determined to be calm when content providing server 10 detects, for example, that the user is sitting in a chair after returning home, based on the user's image data captured by sensor 36 (for example, a camera) of second device 8.

3-11. Use Case 11

Use case 11 is a case in which a first event defined as follows occurs: food being cooked in a cooking appliance such as a stove boils over, and the user turns off the cooking appliance after elapse of a given amount of time (because the user was not paying attention) from the occurrence of the boil-over.

In use case 11, sensor 28 (for example, a boil-over sensor) of first device 6 detects, as the detection information, the occurrence of boil-over. Sensor 36 (for example, a camera) of second device 8 obtains, as the user information, information indicating that the user turned off the cooking appliance after elapse of a given amount of time (for example, 10 minutes) from the time of occurrence of the boil-over.

The detection information from first device 6 and the user information from second device 8 are transmitted to content providing server 10 via information processing apparatus 4. Content providing server 10 refers to content database 50 illustrated in FIG. 4, identifies Event K as the first event from among Events A through L since Event K corresponds to the detection information from first device 6 of boil-over and the user information from second device 8 indicating that the user turned off the cooking appliance after elapse of a given amount of time from the occurrence of the boil-over, and thus determines that Event K has occurred.

In first event database 46 illustrated in FIG. 2, Event K is associated with a category of "fire", a degree of urgency of "medium", a location of occurrence of "kitchen", and a content data transmission timing of "after the user calms down". Content providing server 10 refers to first event database 46 and determines whether the content data transmission timing corresponding to Event K has been reached or not.

Content providing server 10 refers to content database 50 illustrated in FIG. 4 and determines that the content corresponding to Event K is "fire insurance/fire extinguisher/ maintenance service".

With this, when the user calms down, content providing server 10 transmits content data indicating content related to, for example, a fire extinguisher, to information processing apparatus 4. Note that content providing server 10 determines whether the user has calmed down or not based on image data of the user captured by sensor 36 (for example, a camera) of second device 8. Information processing apparatus 4 transmits the content data from content providing server 10 to, for example, first device 6. First device 6 receives the content data from information processing apparatus 4, and displays the content indicated by the received content data (for example, content of "Consider purchasing a fire extinguisher?"). This notifies the user of the content.

When a conversion does not occur in response to notifying the user of the content, if a second event similar to Event K occurs, the user is notified of the content again. Here, the second event is boil-over occurring again within one week.

Sensor 28 of first device 6 detects boil-over occurring again within one week as the detection information. The detection information from first device 6 is transmitted to content providing server 10 via information processing apparatus 4. Content providing server 10 refers to second event database 48 illustrated in FIG. 3 and, based on the detection information from first device 6, determines that boil-over occurred again within one week, as a second event related to Event K.

In second event database 48 illustrated in FIG. 3, the content data transmission timing associated with the second event "boil-over occurring again within one week" is "immediately after occurrence of the second event". Content providing server 10 refers to second event database 48 and determines whether the content data transmission timing has been reached or not.

With this, content providing server 10 transmits content data indicating content related to, for example, a fire extinguisher, to information processing apparatus 4 immediately after occurrence of the second event (i.e., when boil-over occurs again within one week). Information processing apparatus 4 transmits the content data from content providing server 10 to, for example, first device 6. First device 6 receives the content data from information processing apparatus 4, and displays the content indicated by the received content data. This notifies the user of the content again.

3-12. Use Case 12

Use case 12 is a case in which a first event defined as follows occurs: A personal computer (hereinafter "PC") behaves abnormally and the user performs a search related to troubleshooting.

In use case 12, sensor 28 (for example, a temperature sensor) of first device 6 (for example, a PC) detects, as the detection information, an abnormality (for example, an abnormal temperature) in the PC. Communicator 38 of second device 8 (for example, a smartphone) obtains, as the user information, information indicating that the user performed a search the internet or the like related to PC troubleshooting.

The detection information from first device 6 and the user information from second device 8 are transmitted to content providing server 10 via information processing apparatus 4. Content providing server 10 refers to content database 50 illustrated in FIG. 4, identifies Event L as the first event from among Events A through L since Event L corresponds to the detection information from first device 6 of an abnormality in the PC and the user information from second device 8 indicating the user performed a search related to troubleshooting, and thus determines that Event L has occurred.

In first event database 46 illustrated in FIG. 2, Event L is associated with a category of "malfunction", a degree of urgency of "medium", a location of occurrence of "home/work", and a content data transmission timing of "after the abnormality in the PC is resolved". Content providing server 10 refers to first event database 46 and determines whether the content data transmission timing corresponding to Event L has been reached or not.

Content providing server 10 refers to content database 50 illustrated in FIG. 4 and determines that the content corresponding to Event L is "PC support service".

With this, after the abnormality in the PC is resolved, content providing server 10 transmits content data indicating content related to, for example, a PC support service, to information processing apparatus 4. Note that content providing server 10 determines whether the abnormality in the PC is resolved based on the detection information from first device 6. Information processing apparatus 4 transmits the content data from content providing server 10 to, for example, first device 6. First device 6 receives the content data from information processing apparatus 4, and displays the content indicated by the received content data (for example, content of "Consider using a PC support service?"). This notifies the user of the content.

When a conversion does not occur in response to notifying the user of the content, if a second event similar to Event L occurs, the user is notified of the content again. Here, the second event is the creation of a file having a longer editing time than usual.

Sensor 28 of first device 6 detects the creation of a file having a longer editing time than usual as the detection information. The detection information from first device 6 is transmitted to content providing server 10 via information processing apparatus 4. Content providing server 10 refers to second event database 48 illustrated in FIG. 3 and, based on the detection information from first device 6, determines that a file having a longer editing time than usual was created, as a second event related to Event L.

In second event database 48 illustrated in FIG. 3, the content data transmission timing associated with the second event "creation of a file having a longer editing time than usual" is "while the second event is occurring". Content providing server 10 refers to second event database 48 and determines whether the content data transmission timing has been reached or not.

With this, while the second event is occurring (i.e., while the user is creating a file having a longer editing time than usual), content providing server 10 transmits content data indicating content related to, for example, a PC support service, to information processing apparatus 4. Information processing apparatus 4 transmits the content data from content providing server 10 to, for example, first device 6. First device 6 receives the content data from information processing apparatus 4, and displays the content indicated by the received content data. This notifies the user of the content again.

4. Advantageous Effects

As described above, in system 2 according to this embodiment, a first event is determined to have occurred based on detection information detected by first device 6 and user information obtained by second device 8. Content is determined based on the first event, and after elapse of a given amount of time—which is predetermined per first event—from occurrence of the first event, the user is notified of the content by transmission of data indicating the content to first device 6 or second device 8.

This makes it possible to notify the user of content optimal for recommendation to the user, at an optimal timing. This in turn makes it possible to improve the customer appeal of the content to the user.

Other Variations

Although the above describes a control method and an information processing apparatus according to one or more aspects by way of an exemplary embodiment, the present disclosure is not limited to the above exemplary embodiment. Those skilled in the art will readily appreciate that many modifications are possible in the exemplary embodiment and combinations of elements across exemplary embodiments are possible without materially departing from the novel teachings and advantages of the present disclosure. Accordingly, all such modifications are intended to be included within one or more aspects of the present disclosure.

In the above exemplary embodiment, the user is notified of the content by transmission of the content data to first device 6 or second device 8 at least once before a time of occurrence of the second event and at least once after the time of occurrence of the second event, but this example is non-limiting. For example, the user may be notified of the content by transmission of the content data to first device 6 or second device 8 before the time of occurrence of the second event.

Alternatively, the user may be notified of the content by transmission of the content data to first device 6 or second device 8 after the time of occurrence of the second event. In such cases, the timing (given point in time) of the transmission of the content data may be determined based on the first event and the second event.

In the above exemplary embodiment, information processing apparatus 4 and first device 6 are provided as separate configurations, but this example is non-limiting. For example, information processing apparatus 4 may include the functions of first device 6.

In the above exemplary embodiment, content providing server 10 stores first event database 46, second event database 48, and content database 50, but this example is non-limiting. For example, at least one of these databases may be stored in a different server.

In the above exemplary embodiment, content providing server 10 stores the content data transmission timings in first event database 46 and second event database 48, but this example is non-limiting. For example, processor 24 of first device 6 or processor 32 of second device 8 may count the given amount of time until the content transmission timing is reached. Alternatively, processor 40 of content providing server 10 or processor 14 of information processing apparatus 4 may count the given amount of time until the content transmission timing is reached, and after elapse of the given amount of time, may instruct first device 6 or second device 8 to transmit the content data.

Each element in the above exemplary embodiment may be configured as dedicated hardware, or may be realized by executing a software program suitable for the element. Each element may be realized by a program executing unit, such as a CPU or a processor, reading and executing a software program recorded on a recording medium such as a hard disk or semiconductor memory.

Part or all of the functions of the information processing apparatus according to the above exemplary embodiment may be realized by a processor such as a CPU executing a program.

The method described in the above exemplary embodiment may be executed by at least one of processors 14, 24, 32, and 40. Moreover, the steps in the method may be executed by different processors. In other words, the agent or agents that execute the operations may be server-side (content providing server 10 or information processing apparatus 4) or client-side (first device 6 or second device 8).

Part or all of the elements of each device described above may be configured as a detachable IC card or a stand-alone module. The IC card or the module is a computer system including, for example, a microprocessor, ROM, and RAM. The IC card or the module may include a super-multifunction LSI. The IC card or module achieves its function as a result of the microprocessor operating according to the computer program. The IC card or module may be tamper proof.

The present disclosure may be realized as the method described above. The present disclosure may also be a computer program realizing this method via a computer, or a digital signal of the computer program. The present disclosure may be realized as the computer program or the digital signal recorded on a non-transitory computer-readable recording medium such as a flexible disk, hard disk, CD-ROM, MO, DVD, DVD-ROM, DVD-RAM, Blu-ray™ Disc (BD), or semiconductor memory. The present disclosure may be realized as the digital signal recorded on one or more of these recording media. The present disclosure may be realized by transmitting the computer program or the digital signal, for example, via an electronic communications line, a wireless or wired line, a network such as the internet, or data broadcasting. The present disclosure may be realized by a computer system including a storage apparatus storing the computer program and a microprocessor, and the microprocessor operating according to the computer program. The storage apparatus may include a recording medium. Specifically, the storage application may include semiconductor memory found in a CPU such as a resistor or cache memory, a main memory (a main storage apparatus/RAM), or storage (an external storage apparatus/an auxiliary storage apparatus), and the storage may be online storage or offline store. The program or the digital signal may be implemented by an independent computer system by being stored on the recording medium and transmitted to the computer system, or transmitted via the network to the computer system.

Industrial Applicability

The control method according to the present disclosure is applicable in, for example, a system for recommending content to a user.

The invention claimed is:

1. A control method in a system including at least one processor and a storage apparatus, the control method causing the at least one processor to perform the following:
   transmitting detection information and user information to a network, the detection information being detected by a first device, the user information being related to a user and obtained by a second device;
   determining that a first event occurred based on the detection information and the user information, the first event being any one of a plurality of events stored in the storage apparatus, the first event being an event that potentially causes a problem in at least one of a home of the user, property owned by the user, a service expected by the user, or a physical body of the user;

determining content based on the first event, the content being at least one of a product for addressing the problem, a service for addressing the problem, or insurance that provides compensation for damages incurred by the user if the problem were to actually occur; and notifying the user of the content by transmitting data indicating the content to the first device or the second device via the network after elapse of a given amount of time from an occurrence of the first event, the given amount of time being predetermined per event included in the plurality of events.

2. The control method according to claim 1,
wherein the storage apparatus includes, as attribute information indicating an attribute of the first event, information indicating at least one of a category, a degree of urgency, and a location of occurrence, and
the given amount of time varies depending on the attribute information.

3. The control method according to claim 1,
wherein the at least one processor notifies the user of the content by transmitting the data to the first device or the second device before a time of occurrence of a second event similar to the first event.

4. The control method according to claim 1,
wherein the at least one processor notifies the user of the content by transmitting the data to the first device or the second device after a time of occurrence of a second event similar to the first event.

5. The control method according to claim 4,
wherein the given amount of time is determined based on the first event and the second event.

6. The control method according to claim 1,
wherein the at least one processor notifies the user of the content by transmitting the data to the first device or the second device at least once before a time of occurrence of a second event similar to the first event and at least once after the time of occurrence of the second event.

7. The control method according to claim 3,
wherein the at least one processor determines that the second event occurred based on the detection information and the user information.

8. The control method according to claim 1,
wherein the at least one processor is included in a server or a client.

9. An information processing apparatus capable of communicating with a first device and a second device via a network, the information processing apparatus comprising:
a processor; and
a storage apparatus,
wherein, using the storage apparatus, the processor:
transmits detection information and user information to the network, the detection information being detected by the first device, the user information being related to a user and obtained by the second device;
when the processor determines that a first event occurred based on the detection information and the user information, receives data indicating content via the network after elapse of a given amount of time from an occurrence of the first event, the first event being any one of a plurality of events that are predefined, the first event being an event that potentially causes a problem in at least one of a home of the user, property owned by the user, a service expected by the user, or a physical body of the user, the content being at least one of a product for addressing the problem, a service for addressing the problem, or insurance that provides compensation for damages incurred by the user if the problem were to actually occur, and the given amount of time being predetermined per event included in the plurality of events; and
notifies the user of the content by transmitting the data received to the first device or the second device via the network.

* * * * *